United States Patent [19]

Tsáo

[11] Patent Number: 5,312,125
[45] Date of Patent: May 17, 1994

[54] COLLAPSABLE COMPACT BICYCLE

[76] Inventor: Shu Tsáo, Suite 1, 11F, 95-8 Chang Ping Road Sec. 1, Taichung, Taiwan

[21] Appl. No.: 849,182

[22] Filed: Mar. 11, 1992

[51] Int. Cl.$^5$ ............................................. B62K 15/00
[52] U.S. Cl. ................................. 280/287; 384/545; 403/66; 403/325
[58] Field of Search ................... 280/278, 287, 288; 384/545; 403/66, 79, 325, 327, DIG. 6

[56] References Cited

U.S. PATENT DOCUMENTS

| | | | |
|---|---|---|---|
| 3,710,883 | 1/1973 | Rizzo | 280/278 X |
| 4,182,522 | 1/1980 | Ritchie | 280/278 |
| 4,198,080 | 4/1980 | Carpenter | 403/325 X |
| 4,202,561 | 5/1980 | Yonkers | 280/278 |

*Primary Examiner*—David M. Mitchell
*Assistant Examiner*—Andrew C. Pike

[57] ABSTRACT

A collapsible bicycle comprises a frame, a front and rear wheels rotatably attached thereto, and a drivetrain for transmitting torque to the rear wheel, with the frame including a movable structure on which the rear wheel is attached. The frame carries a pair of lower stay elements on a lower portion thereof and a fork member on an upper portion thereof with the prongs of the fork member defining a pair of upper stay elements. The front ends of the lower stay elements are adjoined with respective pivot rings attached to a bottom bracket of the frame so as to enable the rotation of the movable structure thereabout, while the male and female elements of a quick-release type connector are provided on the shank portion of the fork member and an upper portion of a seat tube of the frame to enable the fixing of the movable structure thereto. The frame is further provided with an arcuate down tube adapted for the positioning thereunder of the rear wheel and movable structure when the bicycle is in a compacted form. This being accomplished by first disconnecting the fork member from the frame and then rotating the movable structure about the bottom bracket until the rim of the rear wheel is in proximity with the down tube.

14 Claims, 11 Drawing Sheets

COLLAPSABLE COMPACT BICYCLE

BACKGROUND OF THE PRESENT INVENTION

The present invention relates to bicycles and more more particularly to a bicycle having a collapsible structure that can be compacted when not in use to facilitate storage.

Figure 1:
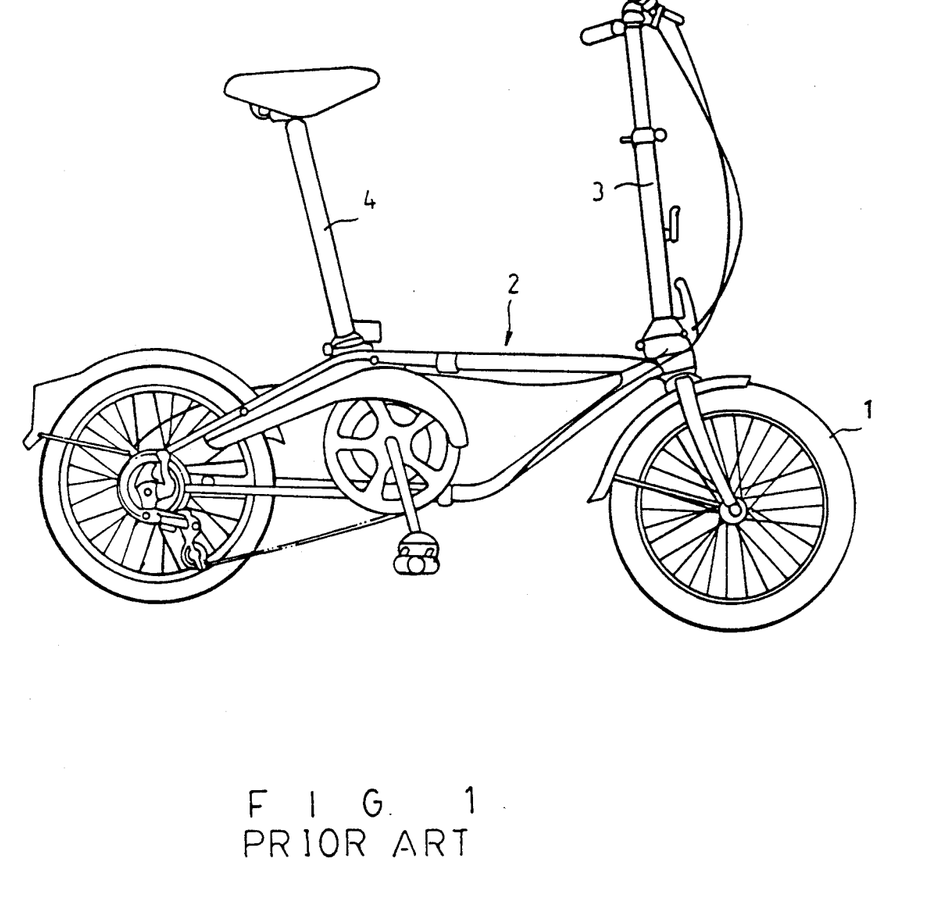
FIG. 1 is a side view of a conventional type collapsible bicycle.
Figure 2:
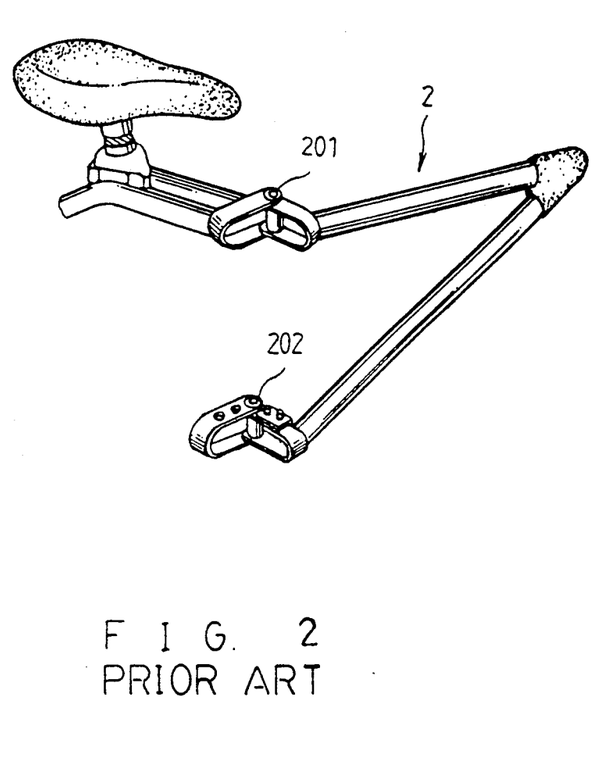
FIG. 2 is a perspective view of pivot connections used in the frame of the conventional collapsible bicycle.

Bicycles having collapsible structures, as exemplified in FIG. 1, are known in which relatively small diameter wheels 1 and a laterally foldable frame 2 are employed. Compacting the bicycle requires folding of the frame about a pair of pivots 201, 202 as shown in FIG. 2, the retraction of a telescoping handle bar stem 3 and the folding down of a pivoted seat post 4. Other collapsible bicycles similarly utilize a laterally foldable frame and/or a multiplicity of steps to attain the desired end.

Whereas, the collapsible bicycle of the present invention has a frame having a downwardly foldable structure that can be quickly compacted without interference from other members of the bicycle, as is common in more conventional collapsible bicycles, and which still provides sufficient rigidity for safe and durable service.

SUMMARY OF THE PRESENT INVENTION

The present invention has as a main object to provide a collapsible bicycle having a frame with a movable rear structure to which the rear wheel is attached which can be pivoted about a lower portion of the frame so as to transpose the movable structure into a predefined space in a medial position on the bicycle for compact storage.

In accordance therewith, the collapsible bicycle comprises a frame, a front and rear wheels rotatable attached with the frame, a drivetrain for transmitting torque to the rear wheel, and a movable structure connected to the frame which carrier the rear wheel. A lower portion of the movable structure is pivotably connected to a first fixed portion of the frame, while an upper portion of the movable structure is releasably connected to a second fixed portion of the frame to fixedly position the movable structure and attached wheel to the rear of the frame during normal usage. After the upper portion of the movable structure is disconnected from the frame the movable structure can be rotated downward and around the first fixed portion of the frame to fold the bicycle into a compacted form.

A more thorough understanding of the present invention will be attained by reference to a detailed description of a preferred embodiment thereof provided below along with accompanying drawings.

DETAILED DESCRIPTION OF THE PREFERRED EMBODIMENT

Figure 3:
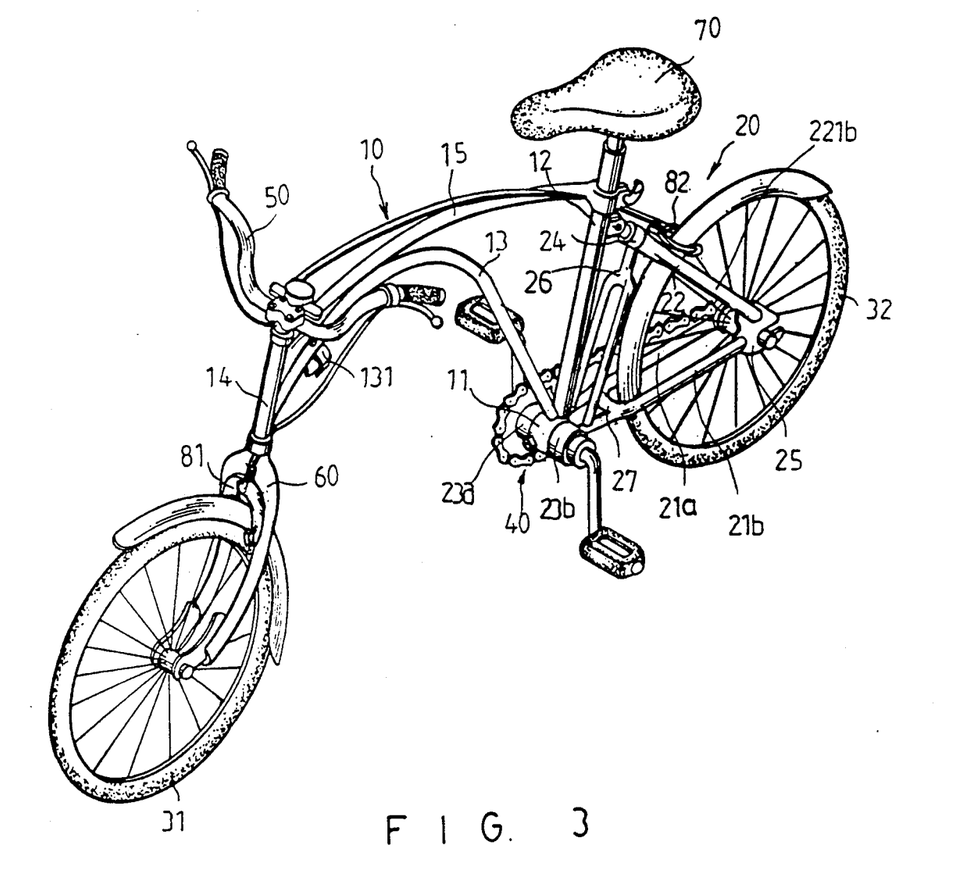
FIG. 3 is a perspective view of the preferred embodiment of the collapsible bicycle of the present invention.

A preferred embodiment of the collapsible bicycle of the present invention is shown in FIG. 3, having a frame 10 with a movable rear structure 20, a front and rear wheels attached therewith, and a drivetrain 40 rotatingly coupled to the rear wheel. The bicycle also includes a height adjustable handle bar 50 connected to a front fork 60 via a head tube 14, a height adjustable seat 70 on top a seat tube 12, a curved top tube 15 connecting the head tube and seat tube, and front and rear brakes 81,82 as are found on more conventional bicycles.

Figure 4:
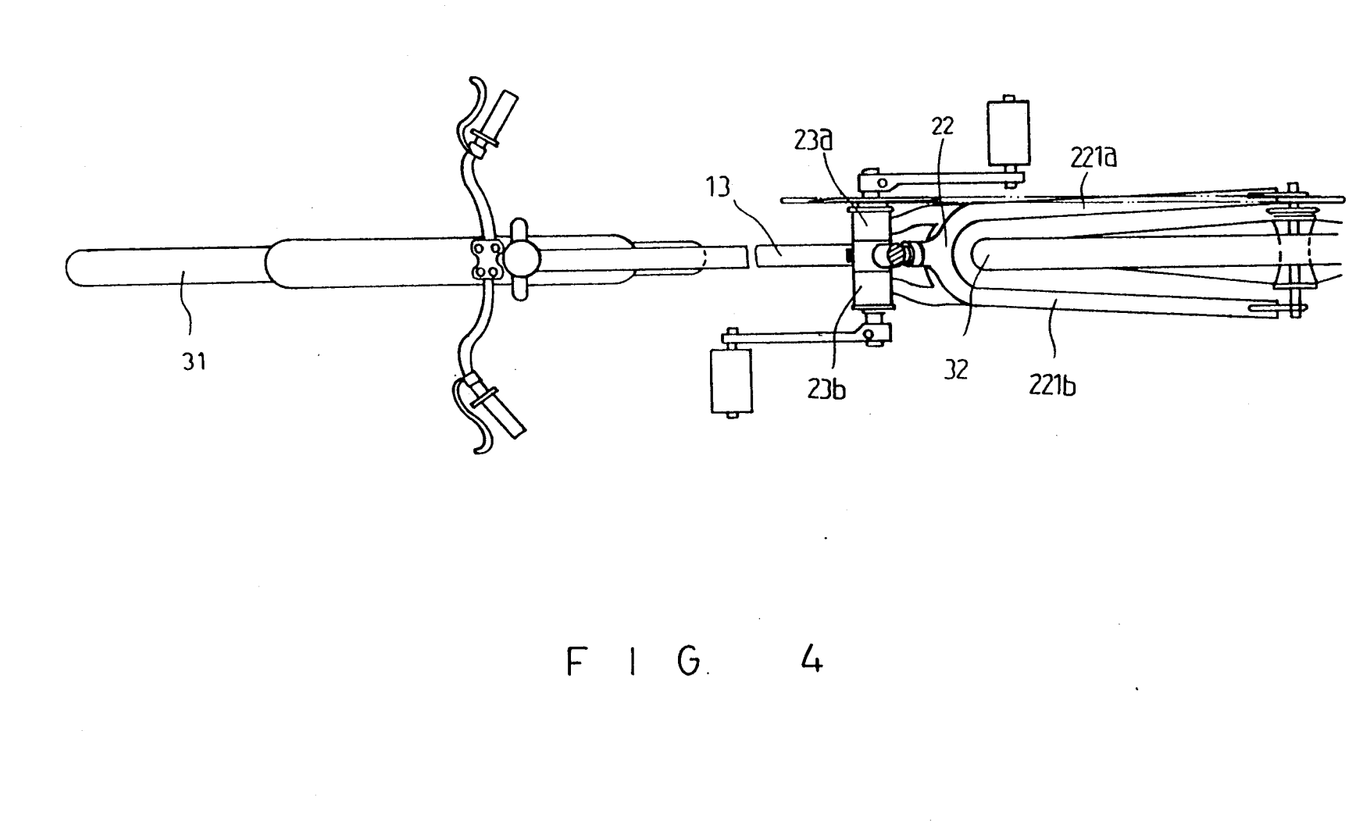
FIG. 4 is a plan view of the bicycle ready for use with a movable structure thereon fixed to the rear of the frame thereof.

Referring also to FIG. 4, movable structure 20 comprises a pair of tubular lower stay elements 21a,21b and an upper fork member 22 with the prongs thereof defining a pair of tubular lower upper stay elements 21a, 21b.

The forward ends of lower stay elements 221a,221b are adjoined with respective pivot rings 23a,23b on a bottom bracket 11 of the frame so as to enable the rotation of the movable structure thereabout. A quick-release type connector 24 releasably secures the shank portion of fork member 22 to a seat tube 12 of the frame when the bicycle is in use and is disconnected prior to the folding of the bicycle to a compacted form.

The rear ends of upper stay elements 221a,221b and lower stay elements 21a,21b adjoin respectively at a pair of dropout plates 25 on which the axle of rear wheel 32 is carried. The connection between fork member 22 and lower stay elements 21a,21b is reinforced by a fork like cross member 26 adjoined therebetween so as to increase the rigidity of the movable structure. The shank of the cross member adjoins with fork member 22 below the juncture portion thereof and the prongs adjoin with respective lower stay elements 21a,21b near bracket 11 so that the movable structure assumes a generally triangular plan form. Similarly, a tubular cross element 27 traverses lower stay elements 21a,21b being adjoined therebetween to increase their resistance to lateral divergence.

Figure 5:
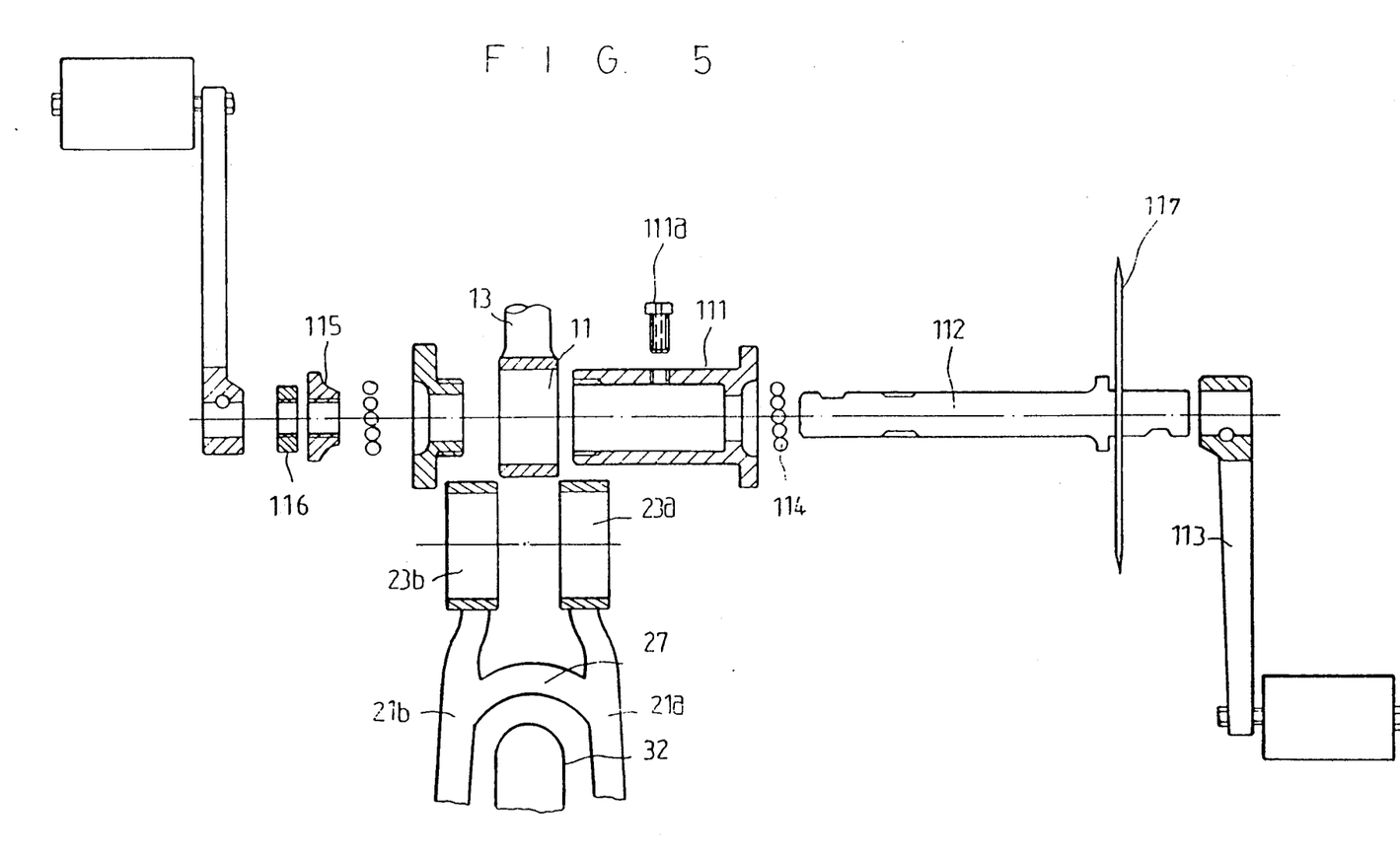
FIG. 5 is an exploded sectional view of a pivot assembly of the bicycle including a pair of pivot rings and a bottom bracket of the frame.

As shown in FIG. 5, pivot rings 23a,23b and bottom bracket 11 are generally cylindrical in form and have equal diameters. A two piece, threadedly coupled journal sleeve 111 positioned therein holds the pivot rings and bottom bracket together with the journal sleeve being fixed to bottom bracket 11 by a radial screw 111a passing therethrough. The flanged outer ends of journal sleeve 111 rotatably position pivot rings 23a, 23b therebetween. As with conventional bicycle drivetrains, a crankaxle 112 having pedal carrying cranks 113 attached to the opposite ends thereof is rotatingly secured within the journal sleeve in the conventional manner using ball bearings 114, a cone 115, and a lockout 116 on either side thereof. A chainwheel 117 is also fixed to one side of the crankaxle for engaging the drivetrain of the bicycle.

Figure 6:
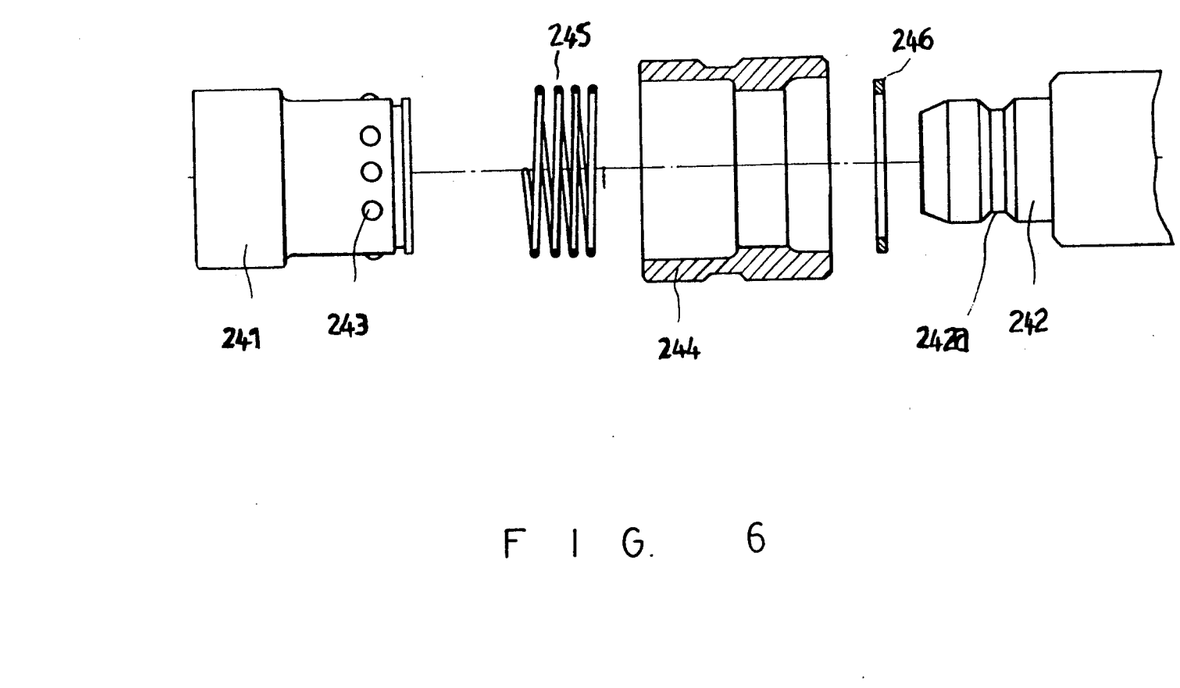
FIG. 6 is an exploded side view of a quick release type connector used to fix an upper portion of the movable structure to the frame, showing in section the stepped internal diameter of a sliding member thereof.
Figure 7:
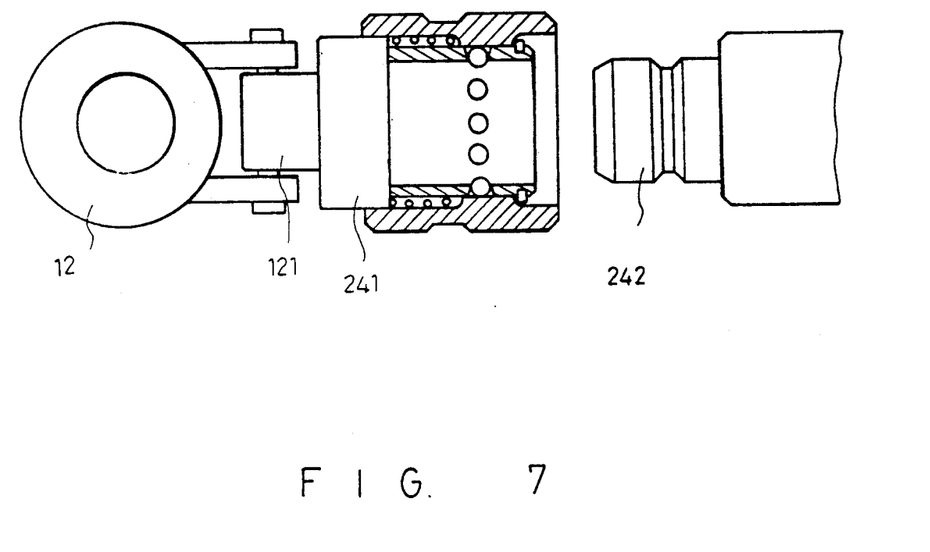
FIG. 7 is a partly sectional side view of the quick release type connector showing the pivoted connection of a tubular extension thereof with the seat tube of the frame.

FIGS. 6 and 7 detail the quick-release type connector used to fix the movable structure to frame 10, wherein a tubular extension 241 which is pivotably attached to seat tube 12 below the juncture of the top tube therewith by a clevis joint 121 engages a shaft member 242 provided on a shank portion of fork member 22. A plurality of balls 243 are disposed in a set of radial apertures formed around the extension 241 which have inner cross-sections significantly narrower than the diameter of the balls so as to prevent their passage therethrough. The tubular extension has a sleeve member 244 of stepped inner diameter which is slidingly positioned thereover by a retaining ring 246 secured around the free end thereof. Compression spring 245 urges the sleeve member towards a position whereat a smaller diameter internal section therein is in registry with the apertures of extension 241, causing balls 243 to protrude radially inwards and obstruct the interior passage of the tubular extension.

Figure 7A:
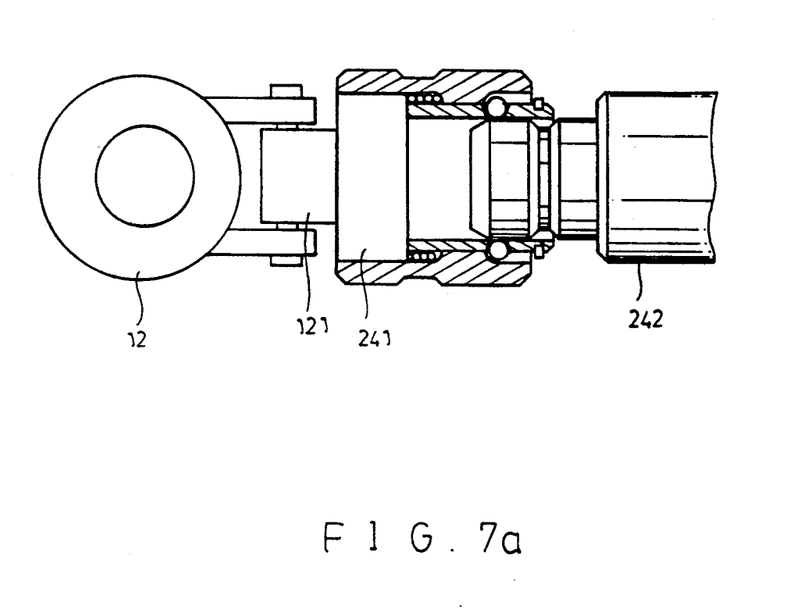
FIG. 7a shows a shaft member secured to the movable structure being inserted into the tubular extension of the quick release type connector.
Figure 7B:
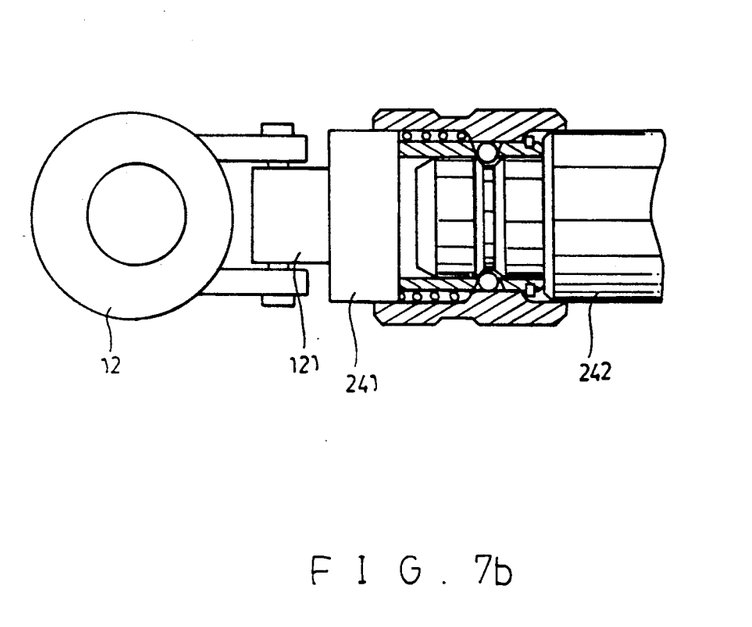
FIG. 7b shows the shaft member fully inserted and locked in position within the tubular extension.

Referring to FIGS. 7a and 7b, shaft member 242 can be inserted into extension 241 by first retracting the sleeve member to a position whereat a larger diameter internal section therein is in registry with the apertures of the extension, allowing the outward expansion of the balls caused by the passage of the shaft member which has a tapered forward end. After the free end of extension 241 is brought into abutment with the adjoining base of shaft member 242, the sleeve member is allowed to travel forward under the biasing action of spring 245 so as to once again cause balls 243 to protrude radially inwards and engage a cooperating circumferential groove 242a on the shaft member. This blocks further movement of the shaft member relative to the extension and locks movable structure 20 to frame 10. The shaft member can be disengaged from the extension by again pulling back the sleeve member so as to allow expansion of the balls caused by the caming action of groove 241a during the retraction of the shaft member.

Figure 8:
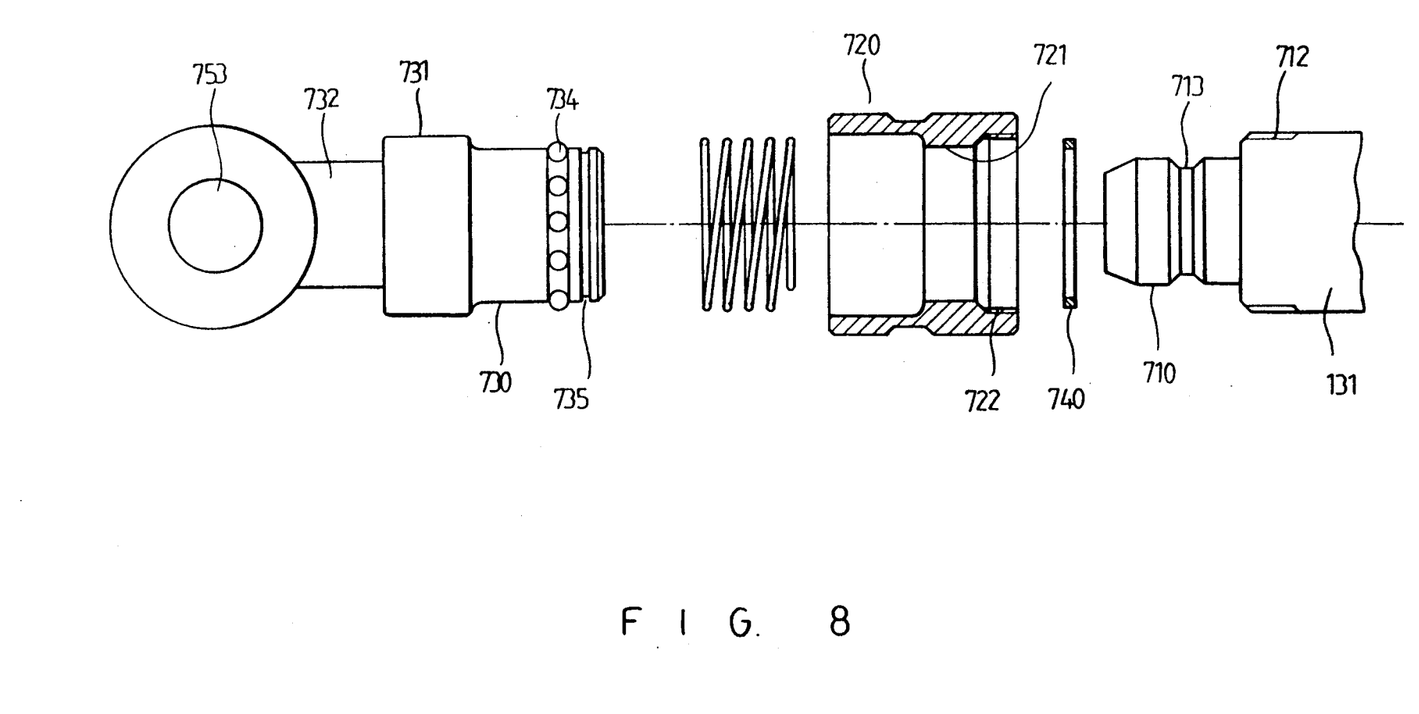
FIG. 8 is a perspective view of the collapsible bicycle of the present invention in compacted form.
Figure 9:
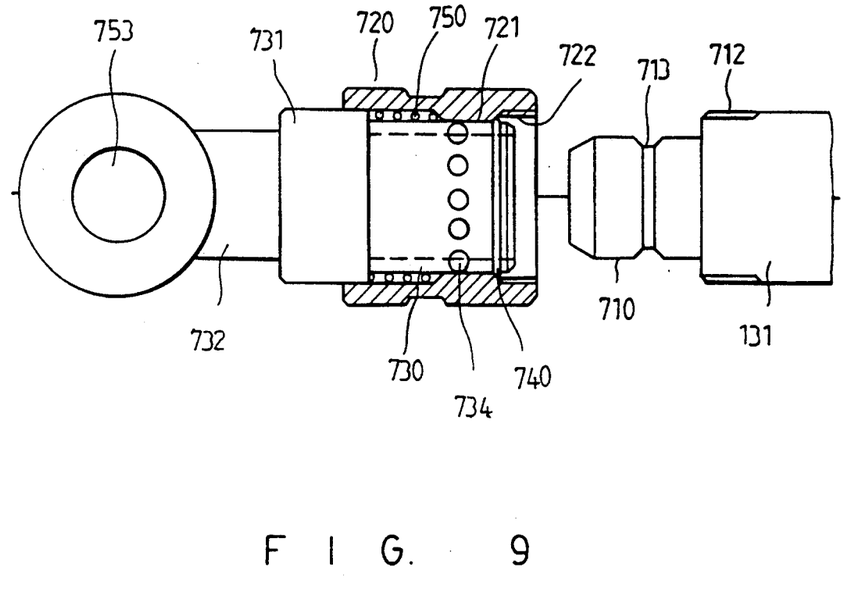
FIG. 9 is a plan view of the bicycle in compacted form with the movable structure thereof held in position below an arcuate down tube of the frame.

After the upper portion of structure 20 is disconnected from frame 10 as described above, the movable structure and attached rear wheel 32 can be rotated downward and around bottom bracket 11 so as to position the rear wheel under an arcuate downtube 13, as shown in FIGS. 8 and 9. The downtube has a form adapted for receiving the wheel and movable structure thereunder and has an elastic C-shaped clamped 131 fixed to the underside thereof which engages the rim of wheel 31 to hold the movable structure in position. Front wheel 31 is skewed relative to the frame so as to not interfere with the positioning of the rear wheel and movable structure.

The collapsible bicycle is thus rendered into a compacted form that can easily be stored. The movable structure can be re-extended to the rear of the frame by releasing the rear tire from clamp 131 and rotating the movable structure in a counterclockwise direction so as to re-engage shaft member 242 on the fork member thereof with the aligned extension 241 on the seat tube, the pivoted extension adapting to the varying angle of engagement of the tilting shaft member.

Though the above description and accompanying drawings includes many specificities, these should not be construed as limitations on the scope of the present invention but are merely one mode of realization of a preferred embodiment thereof. Many variations and modifications to the present invention could readily be accomplished by a person skilled in the art without departing from the spirit or scope thereof.

As an example, various other forms of connectors could also be adapted for fixing the upper portion of the movable structure to the frame, other than the type specifically detailed above, which could be advantageous in light of the particulars of frame geometry, materials specification, or manufacturing.

As such, the spirit and scope of the present invention should not be determined from the above specification but from the appended claims and their legal equivalents.

I claim:

1. A bicycle comprising a frame, a front wheel and a rear wheel attached with said frame, and a drivetrain for transmitting torque to said rear wheel, wherein said frame includes:
   a movable structure to which said rear wheel is rotatably attached;
   a pivoting means for pivotably connecting a lower portion of said movable structure to a first fixed portion of said frame comprising;
   a) a pair of pivot rings provided on the lower portion of said movable structure;
   b) a bracket element on said frame positioned between the pivot rings wherein a crank axle of said drivetrain is positioned therethrough, the pivot rings being rotatably attached to the bracket element by a bearing sleeve positioned in the pivot rings and the bracket element, with the bearing sleeve being fixed to the bracket element and having flanged outer ends rotatably positioning the pivot rings therebetween; and
   a connecting means for releasably connecting an upper portion of said movable structure to a second fixed portion of said frame.

2. A bicycle according to claim 1, wherein said movable structure includes a pair of lower stay elements, a first end portion of each said lower stay element carrying the axle of said rear wheel, the opposing ends of each said stay element being joined with respective said pivot rings.

3. A bicycle according to claim 2, wherein said movable structure further includes a cross element provided between the pair of said lower stay elements.

4. A bicycle according to claim 3, wherein said frame includes an arcuate tubular member disposed between said front wheel and a front portion of said drivetrain, said tubular member receiving thereunder said rear wheel and said movable structure after the upper portion of said movable structure is disconnected from the second fixed portion of said frame and said movable structure with said rear wheel are rotated about the bracket element.

5. A bicycle according to claim 4, wherein said connecting means comprises;
   a tubular extension provided on the second fixed portion of said frame, said tubular extension having a plurality of apertures formed radially thereon;
   a sleeve member slidingly retained on said tubular extension, said sleeve member having a stepped internal diameter;
   a plurality of blocking elements positioned in respective said apertures, said blocking elements being projected radially inwards through said apertures when in abutment with a smaller diameter section of said sleeve member in registry with said apertures, and outwardly extendible when a larger diameter section of said sleeve is in registry with said apertures so as to not obstruct an inner passage of said tubular extension;

a spring element urging said sleeve member in an axial direction towards a position whereat the smaller diameter section of said sleeve member is in registry with said apertures; and a shaft member provided on the upper portion of said movable structure, said shaft member being insertable into said tubular extension and having a circumferential groove formed thereon engageable with said blocking elements.

6. A bicycle according to claim 5, wherein said tubular extension is pivotably attached to said frame.

7. A bicycle according to claim 6, wherein said movable structure further includes a fork member provided on the upper portion thereof; said fork member having a pair of prong-like upper stay elements with free end portions thereof carrying the axle of said rear wheel, said shaft member of said connecting means being fixed to the shank portion of said fork member.

8. A bicycle according to claim 7, wherein said movable structure further includes a reinforcing means provided between said fork member and said lower stay elements for strengthening said movable structure.

9. A bicycle according to claim 8, wherein said reinforcing means comprises a fork-like cross member having a pair of prongs adjoining with respective said lower stay elements and a shank portion adjoining with said fork member between said upper stay elements and said shaft member of the connecting means.

10. A bicycle comprising a frame a front wheel and a rear wheel attached with said frame, and a drivetrain for transmitting torque to said rear wheel, wherein said frame includes:

a movable structure to which said rear wheel is rotatably attached;

a pivoting means for pivotably connecting a lower portion of said movable structure to a first fixed portion of said frame;

a connecting means for releasably connecting an upper portion of said movable structure to a second fixed portion of said frame; and an arcuate tubular member disposed between said front wheel and a front portion of said drivetrain, said tubular member receiving thereunder said rear wheel and said movable structure after the upper portion of said movable structure is disconnected from the second fixed portion of said frame and said movable structure with said rear wheel are rotated about the first fixed portion of said frame.

11. A bicycle according to claim 10, further comprising a support means for holding said rear wheel and said movable structure in position under said tubular member 12. A bicycle according to claim 11, wherein said support means comprises an elastic roughly C-shaped clamp element fixed to said tubular member, said clamp element being releasably engageable with a rim portion of said rear wheel.

13. A bicycle comprising a frame, a front wheel and a rear wheel attached with said frame, and a drivetrain for transmitting torque to said rear wheel, wherein said frame includes:

a movable structure to which said rear wheel is rotatably attached;

a pivoting means for pivotably connecting a lower portion of said movable structure to a first fixed portion of said frame, and a connecting means for releasably connecting an upper portion of said movable structure to a second fixed portion of said frame comprising:

a) a tubular extension pivotably attached to the second fixed portion of said frame, said tubular extension having a plurality of apertures formed radially thereon;

b) a sleeve member slidingly retained on said tubular extension, said sleeve member having a stepped internal diameter;

c) a plurality of blocking elements positioned in respective said apertures, said blocking elements being projected radially inwards through said apertures when in abutment with a smaller diameter section of said sleeve member in registry with said apertures, and outwardly extendible when a larger diameter section of said sleeve is in registry with said apertures so as to not obstruct the inner passage of said tubular extension;

d) a spring element urging said sleeve member in an axial direction towards a position whereat said smaller diameter section of said sleeve member is in registry with said apertures; and e) a shaft member provided on the upper portion of said movable structure, said shaft member being insertable into said tubular extension and having a circumferential groove formed thereon adapted for engaging said blocking elements.

14. A bicycle according to claim 13, wherein said movable structure further includes a fork member provided on the upper portion thereof, said fork member having a pair of prong-like upper stay elements with the free end portions thereof carrying an axle of said rear wheel, said shaft member of said connecting means being fixed to the shank portion of said fork member.

* * * * *